Jan. 9, 1951 L. H. SNYDER 2,537,167
COFFEE MAKER
Filed Feb. 10, 1947 3 Sheets-Sheet 2
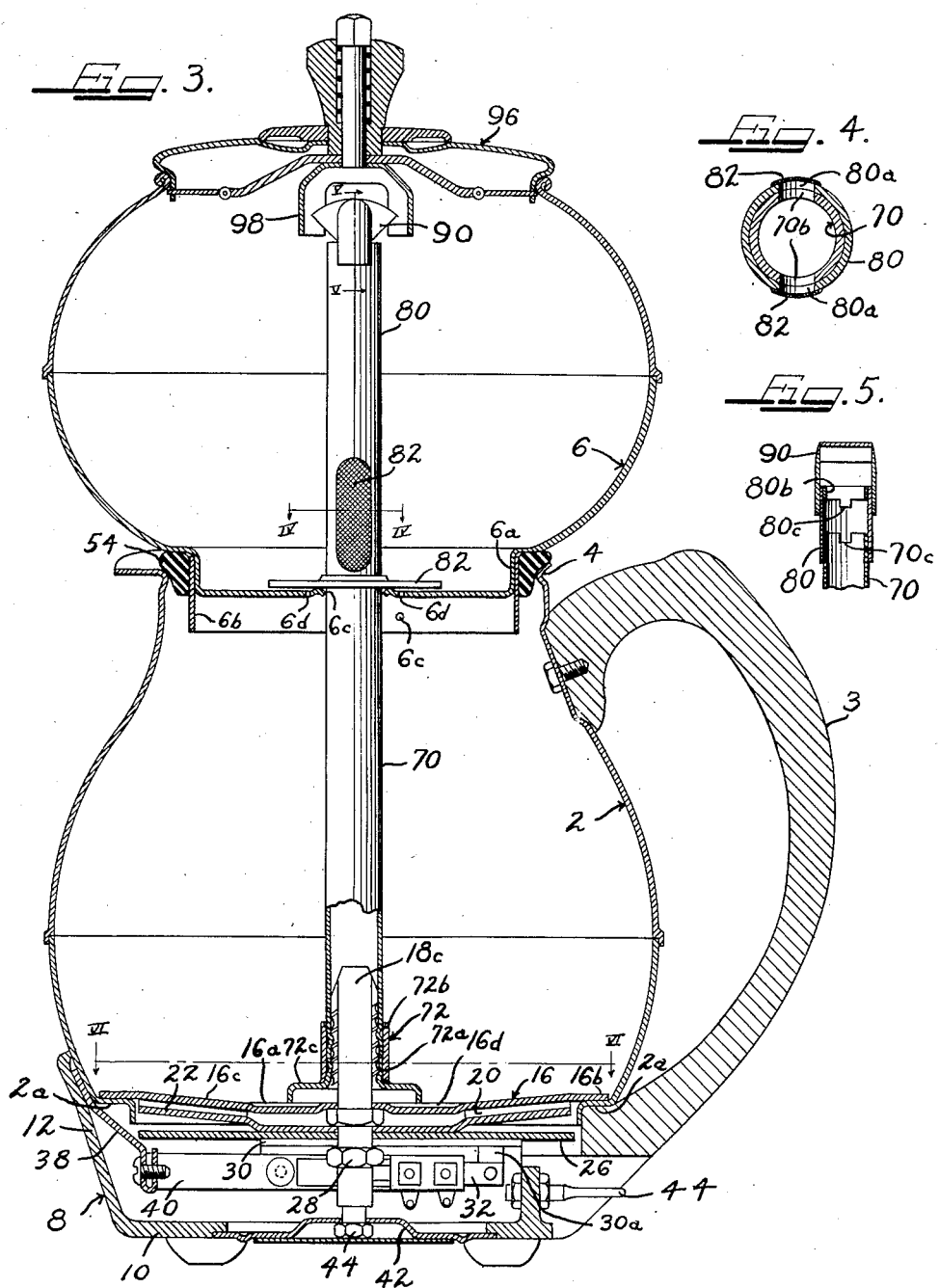
Inventor
LELAND H. SNYDER.

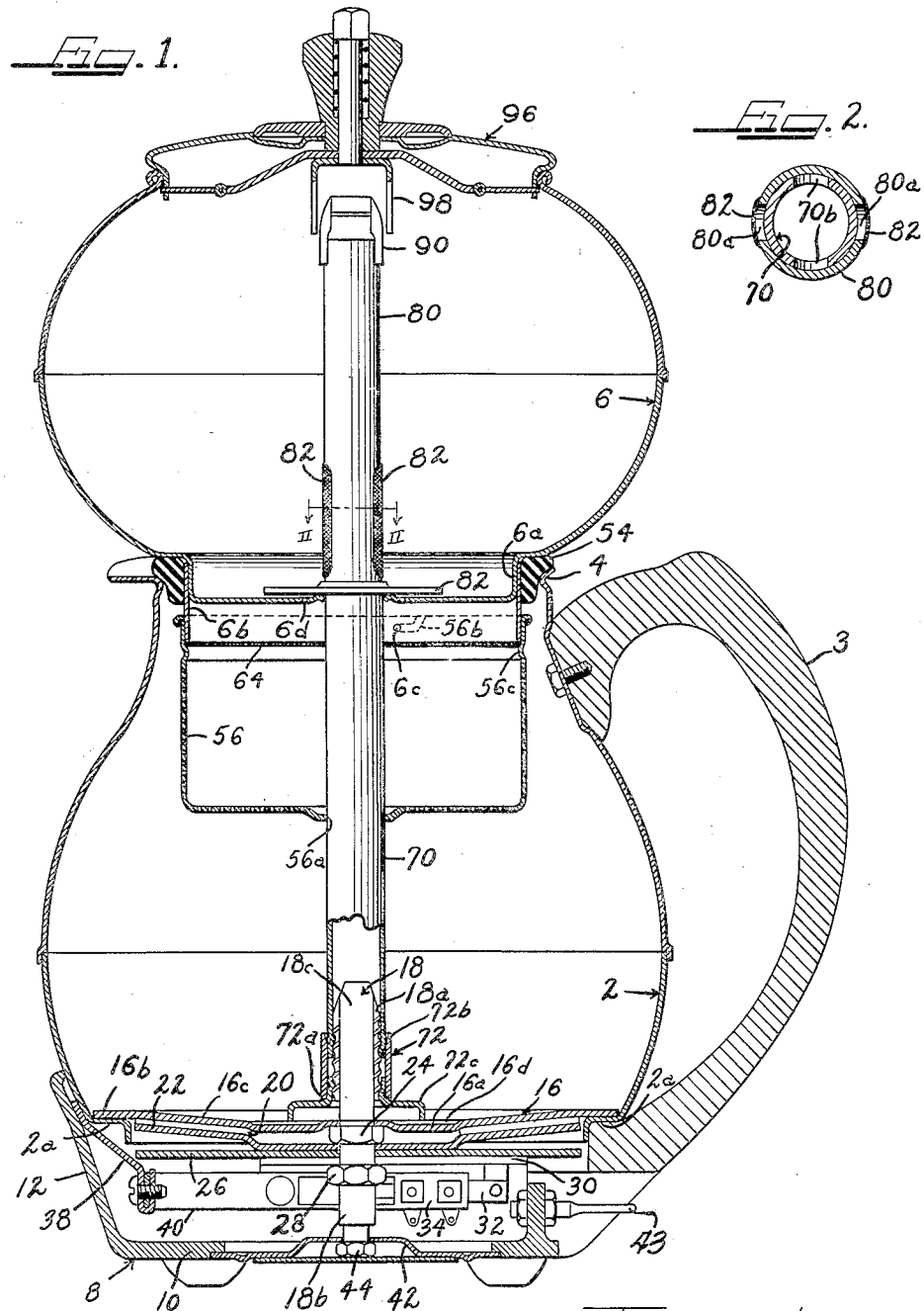

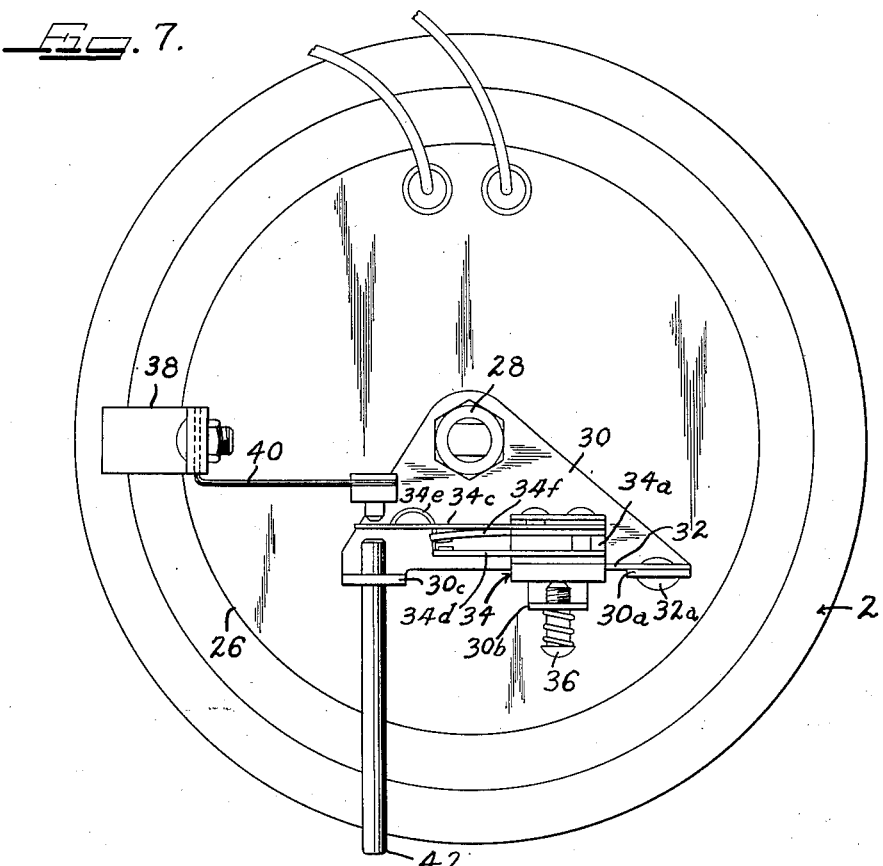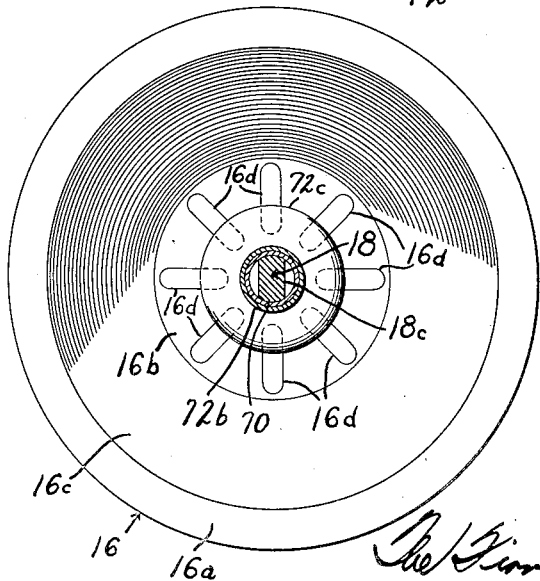

Patented Jan. 9, 1951

2,537,167

UNITED STATES PATENT OFFICE 2,537,167

COFFEE MAKER

Leland H. Snyder, Chicago, Ill., assignor, by mesne assignments, to Knapp-Monarch Company, St. Louis, Mo., a corporation of Delaware Application February 10, 1947, Serial No. 727,499

2 Claims. (Cl. 219—44)

This invention relates to an infusion device, and particularly to a coffee maker utilizing associated upper and lower bowls for preparing coffee infusions which is selectively operable to produce coffee according to either a vacuum or a drip process.

This application constitutes a continuation-in-part of my copending applications Serial No. 570,844, filed January 1, 1945, now Patent No. 2,513,594, Serial No. 653,605, filed March 11, 1946, and Serial No. 655,176, filed March 18, 1946.

In my above referred to co-pending applications, there are disclosed various modifications of coffee makers, some of which are so constructed that coffee may be prepared selectively by either the so-called vacuum process or by the so-called drip process. A particular feature of co-pending application Serial No. 653,605 is the disclosure of a removable fluid transfer tube which is insertable through an aperture in the base of the upper bowl and projects downwardly into the lower bowl to a point adjacent the base thereof where it is detachably secured to an upstanding stud.

This invention also relates to a coffee maker utilizing a removable water transfer tube and is particularly directed to the provision of an improved base structure for the lower bowl of the coffee maker which, in cooperation with a unique construction of the water transfer tube, facilitates the operation of the thermal responsive controlling mechanism for the electrical heating circuit. In coffee makers heretofore known of the associated lower and upper bowl type, the thermostatic control of the heating element has been produced by the increase in temperature of an elevated surface in the base of the lower bowl from which the water is removed by the transfer of water from the lower bowl to the upper bowl by vapor pressure developed upon heating of the water in the lower bowl. All such prior art constructions, however, utilize central depressions in the base of the lower bowl to secure the so called "dry spot" operation. Furthermore, in all constructions of the prior art, it was unavoidably necessary that the bottom end of the water transfer project into such depression and further that a substantial amount of water remain in the depression. The retention of such substantial quantity of water in the lower bowl naturaly exerts a considerable cooling effect on the bottom wall of the lower bowl and the heat responsive action of the thermostat secured to an uncovered portion of the base of the lower bowl was delayed and rendered non-uniform or inaccurate due to the relatively slow rise in temperature.

A feature of this invention is a cooperating water transfer tube and base construction which results in only a practically negligible residue of water remaining in the lower bowl of the coffee maker as a result of transfer of the water in the lower bowl to the upper bowl by the vapor pressure developed in the lower bowl or any other vessel associated with the lower bowl by the heating of the water. This condition is obtained in operation of the coffee maker according to the vacuum process as well as when operating according to the drip process. In fact, when the coffee maker is operated according to the drip process, all of the water is forcibly removed from the lower bowl through the transfer tube and transferred to the upper bowl. Hence the temperature of the heating element will surge rapidly upon the removal of water from the lower bowl and such temperature surge may be utilized in conjunction with a thermal responsive mechanism to effect the deenergization of the electric heating element and the termination of the coffee brewing operation.

Another feature of this invention is an improved mounting arrangement for the thermostatically controlled electric switch of the coffee maker. The mounting arrangement provided by this invention is of utmost simplicity of construction and assembly and permits a wide range of adjustment of the operating point of the thermostatically controlled switch to be obtained through the simple expedient of adjusting a screw member.

Accordingly, it is an object of this invention to provide an improved coffee maker, and particularly a coffee maker of the associated upper and lower type which is readily converted from operation according to a vacuum process to operation according to a drip process and vice versa.

Another object of this invention is to provide an improved base structure and water transfer tube for a coffee maker of the associated upper and lower bowl type by which all but a negligible quantity of water in the lower bowl may be transferred to the upper bowl through the application of heat to the water in the lower bowl.

Another object of this invention is to provide simple, reliable and economical mounting structure for the thermostatically controlled switch of a coffee maker which will permit such switch to be conveniently and accurately adjusted to function from the attainment of any desired temperature condition within the lower bowl of the coffee maker.

Still another object of this invention is to provide an improved removable water transfer tube of the type having a rotatable sleeve valve element provided thereon to permit selective operation of the coffee maker according to a vacuum or drip process, wherein the filter element constitutes a metallic screen disposed across the fluid flow aperture in the sleeve valve member and bonded to the walls defining such aperture.

The specific nature of this invention, as well as other objects and advantages thereof, will become apparent to those skilled in the art from the following detailed description of the annexed sheets of drawings which, by way of preferred example only, illustrate one specific embodiment of the invention.

On the drawings:

Figure 1 is a vertical sectional view of an assembled coffee maker embodying this invention; the coffee maker elements are shown assembled for producing coffee by the drip process;

Figure 2 is a horizontal sectional view taken on the plane II—II of Figure 1;

Figure 3 is a view similar to Figure 1 but showing the elements of the coffee maker assembled for producing coffee by the vacuum process;

Figure 4 is a horizontal sectional view taken on the plane IV—IV of Figure 3;

Figure 5 is a vertical sectional view taken on the plane V—V of Figure 3;

Figure 6 is a horizontal sectional view taken on the plane VI—VI of Figure 3; and Figure 7 is a bottom elevational view of the coffee maker with the base housing removed.

As shown on the drawings:

The coffee maker embodying this invention comprises a lower bowl 2, preferably of metallic construction, having a relatively wide, open top 4 in which is seated a cylindrical base portion 6a on an upper bowl 6. While not limited thereto, the lower bowl 2 is preferably rigidly secured to and mounted on a base housing 8 formed of molded plastic material and having a circular, centrally apertured base 10 and upstanding side wall portions 12 which are shaped on their exterior to blend smoothly with the contour of the side walls of lower bowl 2.

According to this invention, the base 16 of lower bowl 2 is preferably formed as a stamping separate from the walls of lower bowl 2 but supported upon and bonded to an inturned annular flange portion 2a integrally formed on the bottom portion of the side walls of the lower bowl 2.

The central portions 16a, as well as a rim portion 16b of the base 16, are substantially flat but the intermediate portion 16c connecting such flat portions is of slightly concave configuration. As will be apparent later, the slight depressing of the central portion 16a of the base 16 with respect to the marginal portion is desirable to eliminate adverse effects on the temperature control mechanism arising from the operation of the coffee maker on a non-level surface. For operation on a level surface, the entire base 16 could be substantially flat.

In the center of base 16 a vertical stud 18 is secured in bonded relationship. Stud 18 has an upstanding exteriorly threaded portion 18a projecting upwardly in the lower bowl 2 and a depending threaded portion 18b projecting downwardly below the bottom surface of base 16. The upstanding portion 18a of stud 18 is provided with longitudinally extending cutaways or slots 18c for a purpose that will be described.

In the central flat portion 16a of the base 16, a plurality of shallow depressions 16c (Figure 6) are stamped in the base 16, being disposed in generally spoke-like relationship about the stud 18. The radial length as well as the depth of such depressions is quite limited so that the total volume of the depressions 16d constitutes merely a negligible portion of the total volume of lower bowl 2. The depressions 16d serve an important function in connection with the automatic thermostatic control of the coffee maker as will be brought out in detail later.

An electric resistance heating element 20 of annular configuration is provided and is clamped into good heat conducting relationship with the bottom surface of the base 16 by an annular pressure plate 22, which in turn is mounted on the depending stud portion 18b and tightened thereon by a nut 28. In downwardly spaced relationship with respect to the heating element 20, a heat deflecting baffle disk 26 is provided constituting a centrally apertured member mountable upon the depending stud portion 18b and having its upper surface preferably provided with a bright reflecting surface so as to effectively shield the elements below said disk from heat radiations developed by heating element 20. Baffle disk 26 is secured in position on depending stud 18 by being clamped between the nut 24 and a support plate 30 which in turn is held on stud 18 by a nut 28.

Support plate 30, as best shown in Figure 7, is provided with a plurality of downturned ear portions, respectively 30a, 30b and 30c. A leaf spring 32 has one end thereof suitably secured to the ear 30a, as by the rivet 32a, and at its other end is suitably secured to an insulating base 34a of an electric switch unit 34. An adjusting screw 36 is threaded into a suitable hole in the second ear 30b and engages electric switch unit 34 so that the position of such switch unit may be adjusted in a substantially horizontal plane by adjustment of the screw 36.

The switch unit 34 is preferably of the snap action type, and while it may comprise any conventional form of snap action switch, it is illustrated as comprising a plurality of contact carrying switch leaves 34d and 34f suitably mounted upon an insulating base 34a. A third leaf 34c is connected to the leaf 34d by a curved arm 34e. The switch 34 is operated in response to temperature conditions in the lower bowl 2 by a bimetal element 40. A heat conducting thermostat mounting stud 38 is suitably secured in good heat conducting relationship to the bottom of lower bowl 2, such for example as by being bonded to the side wall of lower bowl 2 at a point immediately adjacent the inturned flange 2a. The bimetal element 40 is secured to the lower end of the heat conducting stud 38 and is so disposed that the free end thereof will move in substantially the same horizontal plane as the switch operating leaf 34c is disposed and, in particular, will move against switch operating leaf 34c to actuate switch unit 34 to open its contacts in response to the attainment of a desired temperature condition in the lower bowl 2.

From the foregoing description, it is apparent that the adjusting screw 36 permits an extremely convenient and accurate adjustment of the operating point of the thermostatically controlled switch unit 34. Movement of the screw 36 of course produces a bodily movement of switch unit 34, flexing the support spring 32, and thereby changing the position of the switch operating leaf 34c with respect to the free end of the bimetal element 40.

Switch unit 34 is operated to close its contact by a manually operable reset rod 42. The inner end of rod 42 is journaled in a suitable aperture in depending ear 30c while the outer end thereof projects through an aperture (not shown) provided in the side wall portion 12 of the base housing 8. Hence the moving of the rod 42 inwardly will engage its inner end with the switch operating leaf 34c and effect the closing of the switch contacts.

It will be understood by those skilled in the are that suitable electrical connections are provided interconnecting the heating element 20 in series relationship with the contacts of the switch unit 34 and in turn connecting the resulting circuit across the receptacle prongs 43 which are conventionally mounted in the side wall 12 of the base housing 8 and extend outwardly into a suitable recess provided in the handle 3. Prongs 43 may then be engaged by a conventional receptacle plug and the coffee maker thereby connected to a suitable source of current. Base housing 8 is secured to lower bowl 2 by an annular retainer plate 42 and a nut 44 secured to a reduced diameter end portion of depending stud 18b.

The upper bowl 6 is artistically shaped and, as has been mentioned, is provided on its bottom portion with a generally cylindrical wall 6a. An annular skirt 6b is secured to cylindrical wall portion 6a of the upper bowl in depending relation thereto. An annular seal 54 of rubber-like material surrounds the exterior of skirt portion 6b and cooperates with the inner surface of the top portion 4 of the lower bowl 2 to provide a vapor-tight seal between the upper and lower bowls.

In the operation of the coffee maker according to the drip process, it is necessary to mount a coffee basket beneath the upper bowl 6. To provide a convenient quick detachable support for a suitable coffee basket 56, the bottom portion of depending skirt 6b is provided with a plurality of integral, outwardly projecting nibs 6c. The coffee basket 56 is of conventional configuration, having a suitable central aperture 56a in the base thereof to snugly receive the water transfer tube 70 therethrough. The upper wall portions of basket 56 are provided with a plurality of indentations 56b of bayonet lock configuration which cooperate respectively with the nibs 6c to detachably secure the coffee basket to upper bowl 6. The bottom and side walls of coffee basket 56 may be of the usual perforated construction. An annular, perforated spreader plate 64 is provided across the top portion of coffee basket 56, resting on an integrally formed shoulder 56c in the top of the coffee basket and thus functions to distribute droplets of water received from the upper bowl 6 across the entire surface area of any coffee grounds contained within coffee basket 56.

The base portion 6d of upper bowl 6 is provided with a central aperture 6e through which a water transfer tube 70 may be freely inserted. Around the periphery of central aperture 6e there is provided a plurality of peripherally spaced apertures 6d for a purpose that will be described in detail later.

The bottom end portion of water transfer tube 70 is internally threaded, preferably with a high pitch coarse thread which may be conveniently formed in the tube 70 by a rolling or stamping operation. The threads on the upstanding thread studs 18a are of similar configuration and hence the bottom end of water transfer tube 70 may be detachably secured to the top end of stud portion 18a. An annular, thin walled coupling member 72 is provided having a central portion 72a internally threaded to permit the coupling to be threaded upon the bottom portion of the upstanding stud 18a. The top portion 72b of coupling 72 is of larger interior diameter so as to snugly abut and surround the bottom end of tube 70. The lower portion 72c of coupling 72 is flared outwardly and then downwardly and the bottom face thereof rests upon the undepressed portion of the central base area 6a, overlying part of each of the depressions 16d, or in other words, lying upon those portions of the base surface lying intermediate the depressions 16d. Thus, it is apparent that the coupling 72 in effect constitutes a continuation of the water transfer tube 70 to bring the effective opening of such tube down to a level which is coplanar with the undepressed top surface of the central base portion 18a of the base 16. It is further apparent that the cutaway portions 18c provided on stud portion 18a provide fluid communication between the interior of lower bowl 2 and the interior of water transfer tube 70 through the passages provided by the indentations 16d in the base 16.

The water transfer tube 70 is provided at an intermediate point along its length with an outwardly projecting flange 82 which, in the assembled position of the water transfer tube in the coffee maker, overlies the central aperture 6c in the base of upper bowl 6. Therefore, when the water transfer tube 70 is assembled into the coffee maker by threadably engaging its bottom end portion with the upstanding threaded stud portion 18a, the flange 82 may then be drawn down tightly against the base of upper bowl 6 and an effective seal is thereby provided between the upper bowl 6 and the water transfer tube 70.

Immediately above the flange 82, the water transfer tube 70 is provided with a plurality of axially extending apertures 70b in the walls thereof. A sleeve type valve element 80 is provided which snugly surrounds the apertured wall portion of the water transfer tube 70 and is provided with correspondingly shaped apertures 80a. Valve element 80 is rotatable with respect to water transfer tube 70 and, in one rotative position, effects the alignment of valve sleeve apertures 80a with tube apertures 70b, and in another rotative position, affects the closure of the tube aperture 70b. With such construction, the coffee maker is selectively operable according to the vacuum or drip process by the simple expedient of shifting the rotative position of the valve element 80. In its closed position with respect to the tube apertures, the coffee maker will operate according to the drip process, as will be hereinafter described in detail. In its open position, the coffee maker will function according to the vacuum process.

In the vacuum process it is necessary to provide some form of filter to prevent return of coffee grounds to the lower bowl through the water transfer tube 70. In accordance with this invention, such filter is conveniently provided by metallic screen elements 82 which overlie the apertures in the apertures 80a in the valve sleeve 80 and are bonded to the walls defining such apertures. Thus an effective filtering action is provided by the screens 82 when the valve 80 is in its open position with respect to the water transfer tube 70, yet the screens 82 do not effect the functioning of the water transfer tube 70 when the valve element 80 is in its closed position for producing coffee according to the drip process.

Preferably some form of detent arrangement is provided to releasably secure the valve element 80 in either its open or closed position with respect to water transfer tube 70. For example, the top end of water transfer tube 70 may be provided with a plurality of spaced notches 70c (Figure 5) which cooperate with downwardly projecting lugs 80c on a ring 80b rigidly secured in the top portion of the valve element 80. Also, a fluid dispersion device 90 may be rigidly secured to the top of valve sleeve element 80 and functions to direct streams of water rising through the tube 70 radially outwardly when it reaches the top of the tube.

The rotation of water transfer tube 70 to or from its secured position may be accomplished directly by the fingers of the user or by the rotation of a cover 96 on the top of upper bowl 6, the cover 96 having a depending bifurcated cage element 98 which surrounds fluid dispersion device 90.

When the coffee maker is assembled according to Figure 1, as heretofore described, and a suitable quantity of coffee grounds are placed in the coffee basket 56 and water in the lower bowl, the coffee maker will produce coffee by the so called drip process. A very important factor in the successful operation of the coffee maker according to the drip process lies in the proper proportioning of the total area of the fluid passages 6d provided in the base of upper bowl 6. The actual number of such passages is relatively immaterial, but the total area of the passages must be carefully controlled to insure proper functioning of the coffee maker. As pointed out in my above referred to copending applications, the total area of the fluid passages 6d is selected to be small enough to permit the build up of a substantial vapor pressure in the lower bowl 2 when the contents thereof are heated substantially up to boiling. Such vapor pressure should be sufficient to raise substantially all of the fluid contents of lower bowl 2 up to the water transfer tube 70 and into the upper bowl 6. The existence of fluid passages 6d does of course exert a bleeding action on the pressure developed within the lower bowl 2. However, as the heating of the fluid in the lower bowl is continued up to the boiling point, if the total area of fluid passages 6d is properly proportioned, a point will be reached in which the vapor pressure within the lower bowl 2 builds up faster with the rate of bleeding off of such pressure through the fluid passages 6d. Accordingly, the pressure in the lower bowl 2 builds up rapidly from that point and effects the transfer of the fluid content therein to the upper bowl through the fluid transfer tube 70 in a manner that is well known to those skilled in the art.

The further limitation on the total area of the fluid passages 6d, which is particularly important to facilitate the automatic thermostatic control action of the coffee maker including a base construction such as herein described, is that such passages must permit the draining of fluid from the upper bowl back into the lower bowl at a relatively slow rate, which incidentally has been found to be most desirable for making coffee by the drip process.

The rate of return of the draining fluid should be such that the initial fluid draining through apertures 6d and then through the coffee grounds in coffee basket 56 will not return to lower bowl 2 in any substantial quantity until substantially all of the fluid in the lower bowl has been raised to the upper bowl 6 by the vapor pressure generated in the lower bowl 2. Or in other words, the rate of return of the draining fluid through the apertures 6d and the coffee grounds contained in coffee basket 56 is sufficiently slow to insure that the point will be reached in the water transfer process wherein the only water remaining in the lower bowl is that contained in the depression 16d. When this point is reached, there will be a large surge in temperature of the heating element 20 and as a result, even that small residue of water in the depressions 16d will be evaporated. Such temperature surge readily produces sufficient heat flow through the thermostat support post 38 to the bimetal element 40 to open the contacts of switch 34 and deenergize the heating element 20.

It should be particularly noted that when the described coffee maker is operated according to the drip process, there is a distinct functional difference in operation as compared to that of a conventional thermostatically controlled vacuum type coffee maker. In the described construction, as each succeeding quantity of water from the lower bowl 2 is raised in the water transfer tube 70, such water spills out over the top of the tube 70 into the upper bowl 6 and hence does not depend upon the pressure in the lower bowl 2 for its support in the upper bowl 6. As the water level in the lower bowl 2 approaches a point where all the water is contained in the depressions 16d, the water in tube 70 is literally blown out of the top of the tube by the vapor pressure in lower bowl 2. In fact, when the total volume of the depressions 16d is quite small, even the water in such depressions is blown up through the tube and the entire lower bowl is abruptly cleared of water. Even if all of the water is not instantly blown out of the depressions 16d, from that point on, the lower bowl 2 actually functions as a pressure free boiler, the tube 70 providing immediate release of pressure generated therein to the atmosphere. Hence all of the water remaining in the depressions in the lower bowl is rapidly evaporated. Hence it is not surprising that immediately following the transfer of water to the upper bowl, the temperature of the heating element 20 rises sharply due to the greatly decreased rate of heat dissipation from the base 16 of the lower bowl 2. Such sharp rise is extremely desirable for accurate thermostatic switch operation and, in coffee makers embodying this construction, the opening of the switch contacts occurs with an unusual degree of uniformity at any selected time interval after the elevation of the water to the upper bowl 6 depending only upon the particular adjustment of the adjusting screw.

The proportioning of the total area of the apertures 6d so as to delay the downward flow of water from the upper bowl 6 has already been discussed. However, it is desired to point out, that even though some water does return to the lower bowl 2 through such apertures, before the deenergization of the heating element has occurred, the exposed surface of the base 16 of the lower bowl 2 is sufficiently hot so that such return droplets of water are immediately flashed into steam and recirculated. Generally, the thermostatically controlled switch will be actuated to deenergize the heater 20 before any substantial quantity of coffee liquor is returned to the lower bowl through the apertures 6e and the coffee grounds contained in the coffee basket 56.

To convert the described coffee maker to produce coffee according to the vacuum process, the valve sleeve element 80 is rotated on the water transfer tube 70 to align the valve apertures 80a with the tube apertures 70b. The coffee grounds are then placed directly on the base of the upper bowl 6. The coffee basket 56 may be entirely removed from the coffee maker or left therein as desired.

The energization of the heating element 20 by the closing of the switch unit 34 will heat the water contained in the lower bowl 2, and in time, will generate sufficient vapor pressure in the lower bowl to force such water upwardly through water transfer tube 70 into the upper bowl 6 where it will mingle with the coffee grounds and effect the coffee infusion. However, the interior of water transfer tube 70 is in fluid communication with the interior of upper bowl 6 through the relatively large apertures 70b. Hence, the water in the upper bowl 6 will continually tend by gravity to return to the lower bowl 6. There will, however, be no actual return until the water level in lower bowl 2 drops below the effective end of fluid transfer tube 70, which corresponds to the bottom face of the coupling 72. In the operation according to the vacuum process, it is then observed that a cyclic surging action takes place immediately following the initial transfer of the water from the lower bowl to the upper bowl. That is, as the vapor pressure in the lower bowl increases, it creates an upward draft of substantial velocity in the water transfer tube which carries along practically all of the residue of water remaining in the lower bowl. However, immediately that such excess pressure is liberated, water flows down the inner walls of the tubes to again create a residue in the lower bowl approximately equal to the volume of the spoke-like depressions 16b. The lower bowl is then effectively sealed, the vapor pressure again builds up to a point sufficient to permit it to forcibly escape up through the water transfer tube 70 and thus initiate another surge cycle.

It should be particularly noted that a rapid temperature surge of the heating element, and hence of the lower bowl, is nevertheless produced, inasmuch as the maximum residue of water remaining at any time in the lower bowl after the initial transfer is so small as to have practically negligible cooling effect upon the base 16 of the lower bowl. Hence the temperature of base 16 rapidly increases and reliable operation of the thermostatic switch 34 is assured.

It is desired to point out still another advantageous feature of the coffee maker embodying this invention when operated according to vacuum process. During the initial transfer of water from the lower bowl to the upper bowl, and in the recurring surge-like transfers subsequent thereto, the water flows from the interior of the water transfer tube 70 into the upper bowl 6 through both the side wall apertures 70b and out from the top of the water transfer tube 70 in a generally radial direction as determined by the fluid dispersion device 90. Since the water is applied to the coffee grounds in the upper bowl simultaneously from below and above such grounds an unusual degree of turbulence is produced in the liquid contained in upper bowl 6, thus assuring an intimate contact of the coffee grounds with the water and insuring that complete infusion of all extractable material in the coffee grounds occurs. Such turbulent mixing action continues so long as the heater element is energized by virtue of the recurring upward surges of water and vapor which follow the initial transfer of the water from the lower bowl to the upper bowl.

It will, of course, be understood that various details of construction may be varied through a wide range after departing from the principles of this invention and is, therefore, not the purpose granted hereon otherwise than necessitated by the scope of the appended claims.

I claim as my invention:

1. In a coffee maker, a water container, a stud secured to the base of said container and having a threaded portion depending from said base, a support plate mounted on said stud, said support plate having a plurality of depending ear portions, a leaf spring secured at one end to one of said ear portions, a snap action electric switch secured to the free end of said leaf spring, an operating member for said switch, an adjusting screw threaded in another of said ear portions and arranged to engage said switch to adjust the position of said switch operating member, a heat conducting bracket secured to the base of the container, thermal responsive means supported on the end of said bracket including an arm movable into engagement with said switch operating member to effect an opening of the switch contacts as a function of the temperature of said container, whereby said adjusting screw permits selection of the container temperature at which said switch contacts are opened, and a manual switch operating rod supported for movement into engagement with said switch operating member by a third depending ear portion on said plate, said rod extending laterally beyond the perimeter of said container and being engageable with said switch operating member to effect the closing of the contacts of said switch.

2. In a coffee maker, a water container, a stud secured to the base of said container and having a threaded portion depending from said base, an annular electric heating element surrounding said stud, means including a nut on said stud for clamping said heating element against said base, a heat deflecting baffle disk mounted on said stud downwardly spaced from said heating element, a support plate mounted on said stud below said baffle plate, said support plate having a plurality of depending ears, a leaf spring secured at one end to one of said ears, a snap action electric switch secured to the free end of said leaf spring, means operatively connecting said electric switch in the energization circuit of said heating element, an operating member for said switch, an adjusting screw threaded in another of said ears and arranged to adjust the position of said switch operating member in a substantially horizontal plane, a heat conducting bracket secured to the base of said container, thermal responsive means supported on the end of said container including an arm movable in said horizontal plane to engage said switch operating members to effect the opening of the switch contacts as a function of the temperature of said container, whereby said adjusting screw permits selection of the container temperature at which said switch contacts are open, and a manual switch operating rod supported for sliding movement in said horizontal plane by a third depending ear on said plate, said manual operating rod extending laterally beyond the perimeter of said container and movable into engagement with said switch operating member to effect the closing of the switch contacts.

LELAND H. SNYDER.

REFERENCES CITED

The following references are of record in the file of this patent:

UNITED STATES PATENTS

| Number | Name | Date |
|---|---|---|
| 1,067,206 | Wilkinson | July 8, 1913 |
| 1,555,267 | Colby | Sept. 29, 1925 |
| 2,046,710 | Umstott | July 7, 1936 |
| 2,109,363 | Williams | Feb. 22, 1938 |
| 2,262,286 | Ireland | Nov. 11, 1941 |
| 2,312,555 | Jepson | Mar. 2, 1943 |
| 2,386,278 | Strother | Oct. 9, 1945 |
| 2,388,335 | McCullough | Nov. 6, 1945 |
| 2,394,121 | Ulanet | Feb. 5, 1946 |
| 2,452,508 | Ulanet | Oct. 26, 1948 |